US006496753B1

(12) United States Patent
Ehara

(10) Patent No.: US 6,496,753 B1
(45) Date of Patent: Dec. 17, 2002

(54) CONTROL SYSTEM FOR AUTOMATIC VENDING MACHINE

(75) Inventor: Jun Ehara, Gunma-ken (JP)

(73) Assignee: Fuji Electric Co., Ltd., Osaka-fu (JP)

( * ) Notice: Subject to any disclaimer, the term of this patent is extended or adjusted under 35 U.S.C. 154(b) by 0 days.

(21) Appl. No.: 09/462,031

(22) PCT Filed: Apr. 30, 1998

(86) PCT No.: PCT/JP98/01989

§ 371 (c)(1),
(2), (4) Date: Apr. 5, 2000

(87) PCT Pub. No.: WO99/57690

PCT Pub. Date: Nov. 11, 1999

(51) Int. Cl.[7] .......................... G06F 17/00; G07F 9/00
(52) U.S. Cl. .......................... 700/241; 700/87
(58) Field of Search .......................... 700/21, 79, 86, 700/87, 241; 414/23.1; 340/3.1, 3.31

(56) References Cited

U.S. PATENT DOCUMENTS

| | | | | |
|---|---|---|---|---|
| 4,366,481 A | * | 12/1982 | Main et al. | 340/825.54 |
| 4,562,533 A | | 12/1985 | Hodel et al. | 364/200 |
| 4,598,379 A | | 7/1986 | Awane et al. | 364/479 |
| 5,418,837 A | | 5/1995 | Johansson et al. | 379/58 |
| 5,608,643 A | * | 3/1997 | Wichter et al. | 364/479.14 |
| 5,930,771 A | * | 7/1999 | Stapp | 705/28 |
| 6,038,491 A | * | 3/2000 | McGarry et al. | 700/231 |

FOREIGN PATENT DOCUMENTS

| | | |
|---|---|---|
| GB | 2 244 584 | 12/1991 |
| JP | 03-154922 | 7/1991 |
| JP | 3-154922 | 7/1991 |
| JP | 05-217052 | 8/1993 |
| JP | 06-289911 | 10/1994 |

* cited by examiner

*Primary Examiner*—Paul P. Gordon
(74) *Attorney, Agent, or Firm*—Weingarte, Schurgin, Gagnebin & Lebovici LLP

(57) ABSTRACT

In a terminal control unit, such as a display device (2), a control program is stored in a memory device which can electrically rewrite its data, such as a flash ROM (2*b*). The terminal control unit has a card connector (2*d*) provided therefor, and upon insertion of a memory card storing a control program for updating, into the card connector (2*d*), the control program for updating is transcribed from the memory card into the memory device, whereby updating of the program is performed. Further, when the updating operation is started, a main control unit (1) is notified of start of the updating operation, and therefore the main control unit (1) is prevented from executing a communication abnormality determining process even if it does not receive a response from the terminal control unit. By virtue of this setting, in a control system for the automatic vending machine, which is comprised of the plurality of terminal control units and the main control unit which integratedly controls the terminal control units, the control program for controlling each terminal control unit can be readily updated while the communication abnormality determining process is prevented from being executed.

2 Claims, 3 Drawing Sheets

CONTROL SYSTEM FOR AUTOMATIC VENDING MACHINE

TECHNICAL FIELD

The present invention relates to a control system for an automatic vending machine, which is capable of rewriting a control program for controlling a terminal control unit such as a display device.

BACKGROUND ART

In control of an automatic vending machine in general, sections of the automatic vending machine are divided into a plurality of blocks, and the thus divided blocks are controlled by means of terminal control units, respectively, which are in turn integratedly controlled by a main control unit. In such an automatic vending machine, it is sometimes demanded that the terminal control unit has its control program changed because of partial change of the specification of the vending machine after installing thereof. Description will be made of a change in display device, by way of example, which is one of the terminal control units.

FIG. 4 is a block diagram showing the arrangement of a conventional display device. The display device 2 is connected to a main control unit through a signal line 6, and an amount indicator, an out-of-change state indicator, etc. of the automatic vending machine are controlled, by way of a CPU 2*a*. A control program of the CPU 2*a* is written in a PROM 2*g*, and various data required for controlling the terminal control units are stored in a RAM 2*c*.

Some of the display devices 2 having such the arrangement have been so developed that they display not only the amount of a commodity and the out-of-change state but also advertisements and various kinds of messages. In such a display device of the automatic vending machine, when the displaying manner or the displayed message is changed after installing thereof, the PROM 2*g* is required to change its contents. In such a case, in the conventional display devices, new PROM's in which new programs and data are written are newly provided corresponding in number to the number of the objective automatic vending machines. Further, a person in charge makes the rounds of the installed automatic vending machines, to thereby replace the old PROM's by the new ones.

In such a manner, however, the new PROM's must be prepared corresponding in number to the number of the CPU's which are subjected to program updating. In addition, if the person in charge of mounting the PROM's does not have some experience in the replacing task, he can unfortunately bend a terminal pin of an IC. As a result, the conventional method can impose a problem of a heavy cost.

On the other hand, a ROM, for storing therein a program may be formed by a ROM which can rewrite its data, such as a flash ROM, whereby the program can be updated without exchanging the ROM. However, when the program updating operation is carried out in the display device 2, for instance, the display device 2 cannot respond to a query signal output from the main control unit. Therefore, the main control unit executes a process for determining communication abnormality, to thereby stop its subsequent communication to the display device 2. As a result, after completion of the program updating operation of the display device 2, communication to the main control unit 1 cannot be performed, and therefore the power source of the automatic vending machine has to be once cut off and reset. This can cause a significantly cumbersome task.

The present invention is proposed to eliminate the above-mentioned problems, to thereby readily carry out updating of the control program of the terminal control unit.

DISCLOSURE OF THE INVENTION

To solve the aforesaid problems, a first object of the present invention is to provide a control system for an automatic vending machine, including a plurality of terminal control units and a main control unit for integratedly controlling the terminal control units, wherein a memory device which can electrically rewrite data stored therein is allowed to store a control program in each of the terminal control units, wherein the each of the terminal control units executes by itself updating of the control program stored in the memory device, wherein the each of the terminal control units notifies the main control unit of starting of an updating operation thereof, prior to starting of the updating operation, and wherein the main control unit does not execute an communication abnormality determining process even if the main control unit does not receive a communication signal from the terminal control unit. As a result, the program can be updated without exchanging a ROM, and further the main control unit does not execute an communication abnormality determining process during execution of the program updating operation at the terminal control unit.

Further, a second object of the present invention is to provide the control system for the automatic vending machine, wherein the each of the terminal control units has a card connector provided therefor, the each of the terminal control units functioning, upon insertion of a memory card storing a control program for updating into the card connector, to transcribe the control program for updating from the memory card into the memory device. As a result, the program updating operation can be carried out only by inserting the memory card.

BEST MODE FOR CARRYING OUT THE INVENTION

The present invention will now be described in detail with reference to the drawings showing an embodiment thereof.

Figure 1:
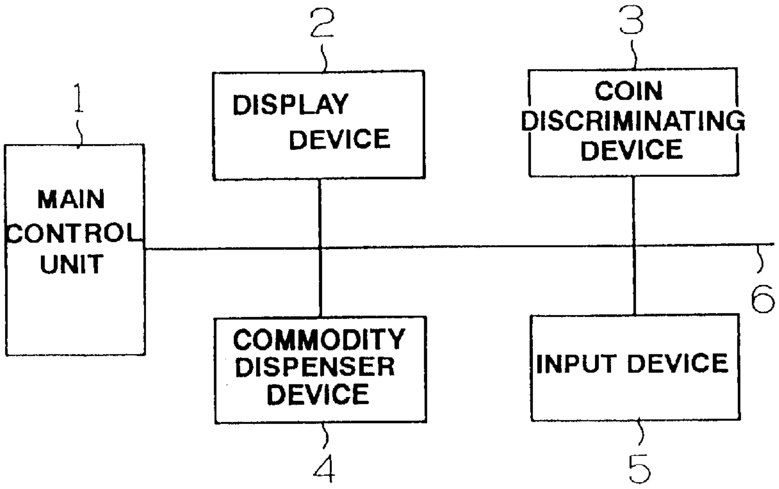
FIG. 1 is a control block diagram of an automatic vending machine according to the present invention.

FIG. 1 is a control block diagram of an automatic vending machine. A display device 2 is comprised of indicators, such as an amount indicator and an out-of-change state indicator, and control units for controlling the same, respectively, none of which is shown. A coin discriminating device 3 carries out discrimination of coins dropped in the automatic vending machine from a coin slot port, not shown, and ejection of change. A commodity dispenser device 4 is comprised of a commodity delivery mechanism and a control unit therefor. An input device 5 functions to set and change various set data of the automatic vending machine. A main control unit 1 executes integrated control of these terminal control units by exchanging data between the terminal control units through a signal line 6, and provides instructions of operations to the terminal control units.

Figure 2:
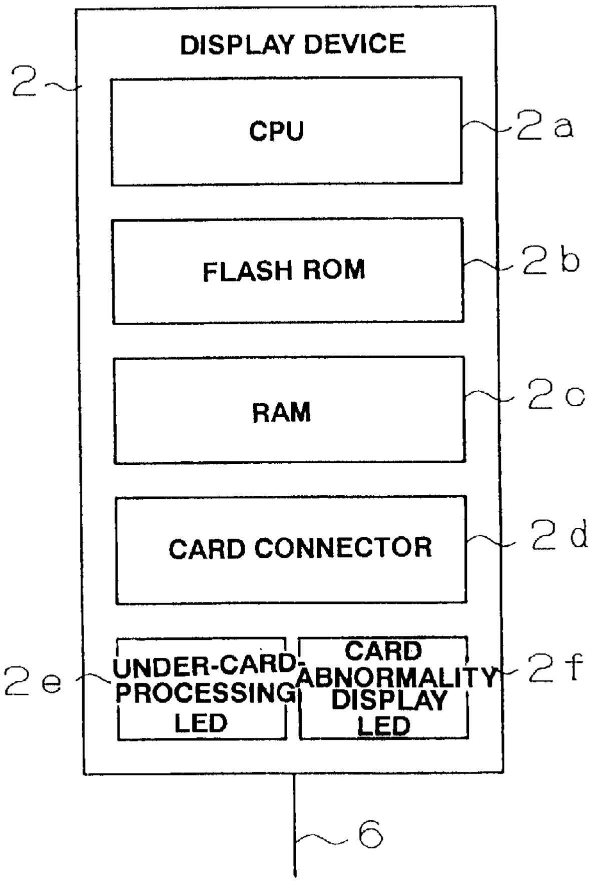
FIG. 2 is a block diagram showing a display device according to the present invention.

The display device 2 is provided with an amount indicator formed, e.g. by a dot-matrix LED, which functions to display not only the amount of dropped coins but also character data and graphic data. The control thereof is executed, as shown in FIG. 2, by a CPU 2*a*, a flash ROM 2*b* which stores therein a program for operating the display device and data to be displayed, and a RAM 2*c* for storing various data. The display device 2 is further comprised of a card connector 2*d* to which is connected a memory card. Upon insertion of a memory card, not shown, in which a program for updating has been written, the program for updating can be transcribed into the flash ROM 2*b*. An under-card-processing indicator LED 2*e* is formed by an LED lamp which notifies, by being lighted, that the memory card has been inserted into the card connector 2*d* to rewrite the contents in the flash ROM 2*b*. A card abnormality indicator LED 2*f* is formed by an LED lamp which notifies, by being lighted, that the contents of the memory card inserted into the card connector 2*d* contains abnormality.

In the automatic vending machine, the program for updating can be transcribed from the memory card inserted into the card connector 2*d*, into the flash ROM 2*b*, and prior to the updating operation, the main control unit 1 is notified of the start of the updating. Upon reception of the notification, the main control unit 1 continues to issue a query signal to the display device 2 until it receives notification of completion of the updating. Even if the main control unit 1 does not receive a response to the query signal, the main control unit 1 does not execute a process for determining communication abnormality. The process of the updating operation at the display device 2 will be described hereinbelow according to a process flowchart.

Figure 3:
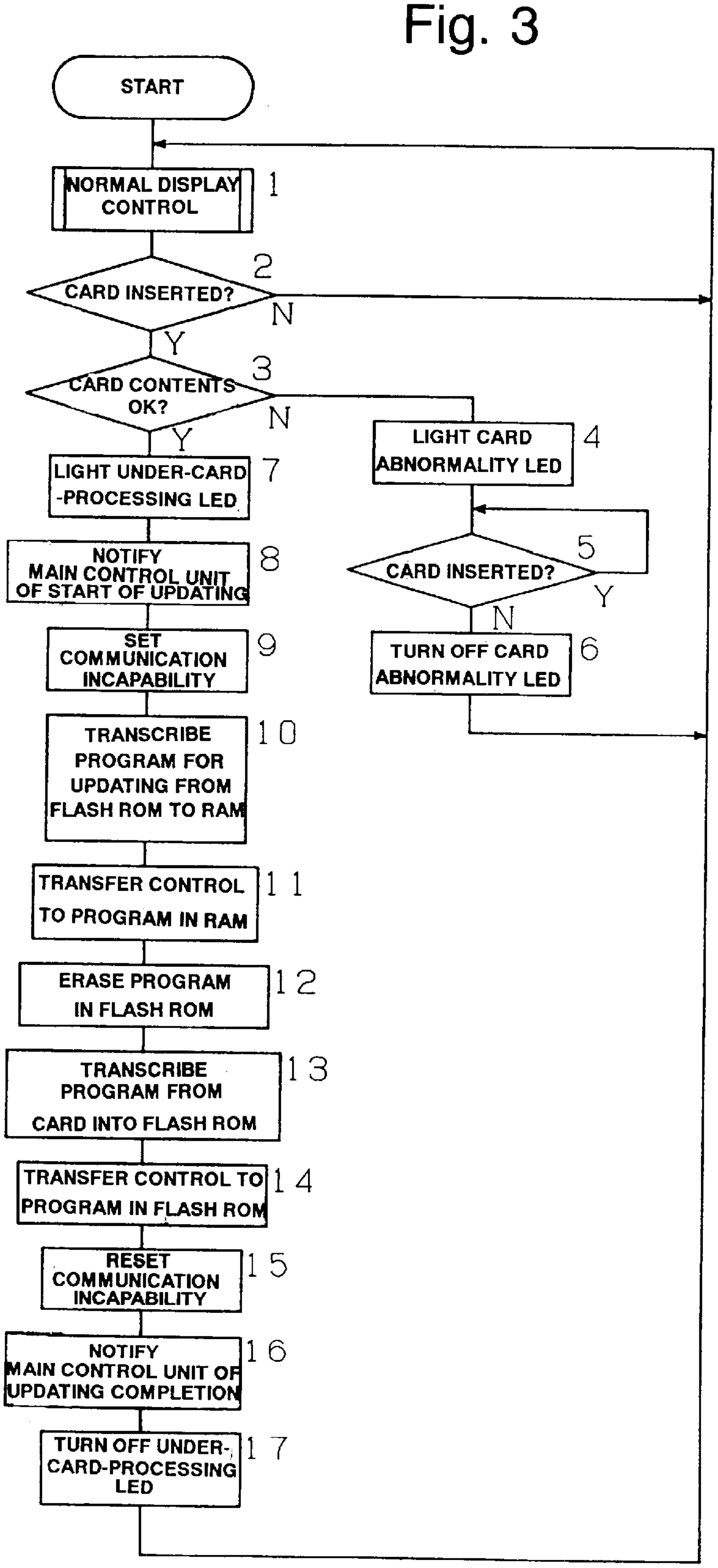
FIG. 3 is a flowchart showing an operation of the display device according to the present invention.
Figure 4:
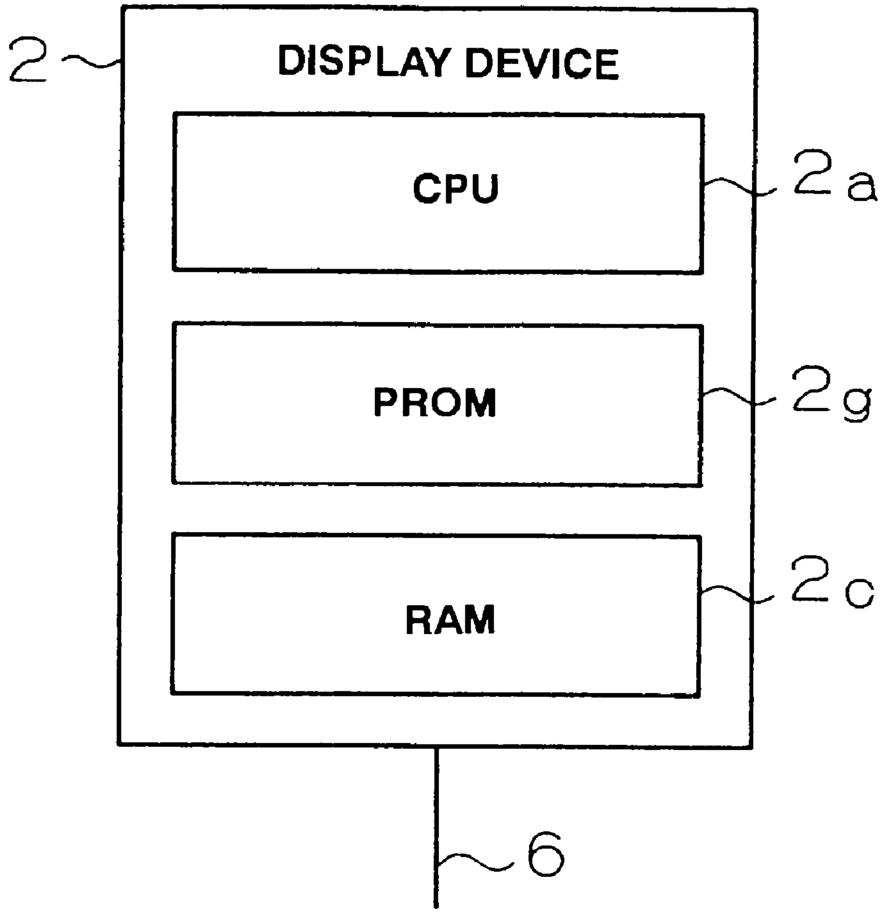
FIG. 4 is a block diagram showing a conventional display device.

FIG. 3 shows the flowchart showing the operation at the display device.

At a step 1, the display device carries out normal display control.

At a step 2, it is determined whether or not the memory card is inserted into the card connector 2*d*, and if the memory card has not been inserted, the process returns to the step 1.

At a step 3, if it is determined that the memory card is inserted, the contents of data written in the memory card are checked, to thereby determine whether or not the contents are data for updating for the flash ROM 2*b*.

At a step 4, if the data written in the memory card are not the data for updating for the flash ROM 2*b*, the card abnormality display LED 2*f* is lighted, to thereby notify that the contents of the card are abnormal.

At a step 5, it is determined whether or not the memory card is still inserted into the card connector 2*d*.

At a step 6, if the memory card is pulled out of the card connector 2*d*, the card abnormality display LED 2*f* is turned off.

If it is determined at the step 3 that the contents are the data for updating for the flash ROM 2*b*, the under-card-processing indicator LED 2*e* is lighted at a step 7, to thereby notify that the memory card is being processed to prevent the memory card from being pulled out during the process.

At a step 8, the main control unit 1 is notified that the updating operation of the flash ROM 2*b* is to be started. Upon reception of the notification, the main control unit 1 supplies a query signal to the display device 2 as heretofore, however, it does not execute the communication abnormality determining process even if it does not receive a response from the display device 2.

At a step 9, a communication incapability flag of the display device 2 is set, and thereafter communication from the display device to the main control unit 1 is stopped.

At a step 10, a program necessary for the updating operation, i.e. a program for executing steps 12 to 14, is transcribed from the flash ROM 2*b* into the RAM 2*c*.

At a step 11, the control is transferred to the program transcribed into the RAM 2*c*.

At a step 12, data in a program storing area of the flash ROM 2*b* are erased.

At a step 13, a new program is read from the memory card, and the thus read program is written into the program storing area of the flash ROM 2*b*.

At a step 14, the control is transferred to the program written in the flash ROM 2*b*. At this time, the state of the operation according to the program before the updating is stored in the RAM 2*c*, and therefore operation is continued without any problem after the transfer of the control to the new program.

At a step 15, the communication incapability flag of the display device 2 is reset, followed by starting communication to the main control unit 1 again.

At a step 16, the main control unit 1 is notified that the updating operation of the flash ROM 2*b* is completed. Upon reception of the notification, the main control unit 1 restores the control of the display device as before.

At a step 17, the under-card-processing indicator LED 2*e* is turned off, to thereby notify that the memory card can be pulled out of the card connector 2*d*.

In the embodiment described above, the objective terminal control unit which has its program updated is the display device 2, and therefore the state of updating can be directly displayed by the under-card-processing indicator LED 2*e*. However, when a program of each terminal control unit other than the display device 2 is updated, each terminal control unit per se. cannot directly display the state. Therefore, upon reception of notification from any terminal control unit other than the display device that the program updating operation is started, the main control unit 1 may issue an instruction for displaying the under-program-updating state, to the display device 2.

Further, in the above-mentioned embodiment, updating of the contents of the flash ROM 2*b* is carried out by using the memory card, but this is not limitative. Alternatively, the display device 2 may be provided with a cable connector, for example, to which a portable terminal device for writing data may be connected, whereby the contents of the flash ROM 2*b* can be updated.

INDUSTRIAL APPLICABILITY

As described hereinabove, in the control system for automatic vending machines according to the present invention, a control program for controlling a terminal control unit is stored in a memory device which can electrically rewrite its data, and updating of the control program can be executed at the terminal control unit. At the time of the updating, the main control unit is notified of start of the updating operation, and therefore the main control unit is prevented from executing a communication abnormality determining process even if it does not receive a response from the terminal control unit. As a result, the updating of the program can be executed without exchanging a ROM of the terminal control unit, and further the main control unit does not execute the communication abnormality determining process during execution of the program updating operation at the terminal control unit.

Further, in the control system for the automatic vending machine according to the invention, the terminal control unit is provided with a card connector, and when a memory card which stores therein a control program for updating is inserted into the card connector, the control program for updating is transcribed from the memory card to the memory device. As a result, the updating operation of the program can be achieved only by inserting the memory card.

What is claimed is:

1. A control system for an automatic vending machine, including a plurality of terminal control units and a main control unit for integratedly controlling said terminal control units:

wherein a memory device which can electrically rewrite data stored therein is allowed to store a control program in each of said terminal control units;

wherein said each of said terminal control units executes by itself updating of said control program stored in said memory device;

wherein said each of said terminal control units notifies said main control unit of starting of an updating operation thereof, prior to starting of said updating operation; and wherein said main control unit is prevented from executing an communication abnormality determining process even if said main control unit does not receive a communication signal from said terminal control unit.

2. A control system for an automatic vending machine as claimed in claim 1, wherein said each of said terminal control units has a card connector provided therefor, said each of said terminal control units functioning, upon insertion of a memory card storing a control program for updating into said card connector, to transcribe said control program for updating from said memory card into said memory device.

* * * * *

UNITED STATES PATENT AND TRADEMARK OFFICE

CERTIFICATE OF CORRECTION

PATENT NO. : 6,496,753 B1

DATED : December 17, 2002

INVENTOR(S) : Jun Ehara

It is certified that error appears in the above-identified patent and that said Letters Patent is hereby corrected as shown below:

Title page,
Item [73], Assignee, "Fuji Electric Co., Ltd., Osaka-fu (JP)" should read
-- Fuji Electric Co., Ltd., Kanagawa-ken (JP) --.

Signed and Sealed this

Seventeenth Day of August, 2004

JON W. DUDAS

*Acting Director of the United States Patent and Trademark Office*